United States Patent
Bellefleur et al.

(10) Patent No.: US 7,261,787 B2
(45) Date of Patent: Aug. 28, 2007

(54) METHOD OF MAKING A FORMABLE HOCKEY STICK BLADE

(75) Inventors: Alain Bellefleur, St-Luc (CA); Win Fream, Newfields, NH (US); Robert M. Miller, Acton, MA (US); Vincent Borbone, Sandown, NH (US)

(73) Assignee: Bauer Nike Hockey Inc., St-Jérôme, Quebec (CA)

( * ) Notice: Subject to any disclaimer, the term of this patent is extended or adjusted under 35 U.S.C. 154(b) by 365 days.

(21) Appl. No.: 10/974,828

(22) Filed: Oct. 28, 2004

(65) Prior Publication Data

US 2006/0090838 A1  May 4, 2006

(51) Int. Cl.
*A63B 59/14* (2006.01)
*B32B 37/00* (2006.01)

(52) U.S. Cl. ............... 156/191; 156/185; 156/194; 156/242; 156/245; 473/563

(58) Field of Classification Search ........... 156/185, 156/189, 191, 194, 242, 245; 473/563
See application file for complete search history.

(56) References Cited

U.S. PATENT DOCUMENTS

| 4,343,468 A | 8/1982 | Lindgren |
| 4,358,113 A | 11/1982 | McKinnon et al. |
| 4,488,721 A | 12/1984 | Franck et al. |
| 5,050,878 A | 9/1991 | Deleris |
| 5,160,135 A | 11/1992 | Hasegawa |
| 5,217,221 A | 6/1993 | Baum |
| 5,333,857 A * | 8/1994 | Lallemand .......... 473/561 |
| 5,407,195 A | 4/1995 | Tiitola et al. |
| 5,676,608 A | 10/1997 | Christian et al. |
| 5,728,016 A | 3/1998 | Hsu |
| 6,033,328 A | 3/2000 | Bellefleur et al. |
| 6,062,996 A * | 5/2000 | Quigley et al. ......... 473/563 |
| 6,626,775 B2 | 9/2003 | Tiitola |
| 6,918,847 B2 * | 7/2005 | Gans et al. ............ 473/563 |
| 7,008,338 B2 * | 3/2006 | Pearson ................ 473/563 |
| 2002/0065154 A1 | 5/2002 | Goldsmith et al. |
| 2003/0104883 A1 | 6/2003 | Caron |
| 2003/0119612 A1 | 6/2003 | Goldsmith et al. |

FOREIGN PATENT DOCUMENTS

| CA | 2062635 | 9/1993 |
| CA | 2228104 | 9/1998 |
| CA | 2244610 | 2/1999 |
| CA | 2357331 A1 * | 3/2002 |
| WO | WO 03/097181 A1 | 11/2003 |

* cited by examiner

*Primary Examiner*—Jeff H. Aftergut

(57) ABSTRACT

The invention provides a method of making a formable hockey stick blade, the method comprising: (a) providing a core having a blade element with a thickness, the core being made of expandable foam having a Poisson ratio of at least 0.33; (b) forming a preformed stick blade by wrapping the core with a layer of fibers pre-impregnated with a thermoplastic material; (c) placing the preformed stick blade in a mold; (d) applying heat and pressure to the mold for bringing the thermoplastic material to its amorphous form and for compressing the preformed stick blade such that the thickness of the blade element of the core is reduced; (e) cooling the mold such that the thermoplastic material is set; and (f) removing the formable stick blade from the mold.

19 Claims, 9 Drawing Sheets

METHOD OF MAKING A FORMABLE HOCKEY STICK BLADE

FIELD OF THE INVENTION

The present invention relates to a method of making a formable hockey stick blade.

BACKGROUND OF THE INVENTION

Typical hockey stick blades or replacement blades are generally made of a wooden core reinforced with one or more layers of synthetic material such as fiberglass, carbon fiber or graphite. The core of the blade may also be made of a synthetic material reinforced with layers of fibers material. The layers are usually made of woven filament fibers, typically soaked in a resin and glued to the surfaces of the core of the blade. Expandable fibers braids may also be used for recovering the core of the blade.

U.S. Pat. No. 6,062,996 discloses a sport implement comprising a blade structure having a core with an elongated insert and a peripheral frame. The blade structure is non-deformable at a first temperature and is formable at a second temperature that is greater that the first temperature and less than 250° F.

There is a demand for a formable hockey stick blade that has a weight, stiffness and strength adapted for high-level hockey players and can be heated and shaped repeatedly to selected curvatures.

SUMMARY OF THE INVENTION

As embodied and broadly described herein, the invention provides a method of making a formable hockey stick blade, the method comprising: (a) providing a core having a blade element with a thickness, the core being made of expandable foam having a Poisson ratio of at least 0.33; (b) forming a preformed stick blade by wrapping the foam core with a layer of fibers pre-impregnated with a thermoplastic material; (c) placing the preformed stick blade in a mold; (d) applying heat and pressure to the mold for bringing the thermoplastic material to its amorphous form and for compressing the preformed stick blade such that the thickness of the blade element of the core is reduced; (e) cooling the mold such that the thermoplastic material is set; and (f) removing the formable stick blade from the mold.

Other objects and features of the invention will become apparent by reference to the following description and the drawings.

BRIEF DESCRIPTION OF THE DRAWINGS

A detailed description of the embodiments of the present invention is provided herein below, by way of example only, with reference to the accompanying drawings, in which.

Figure 1:
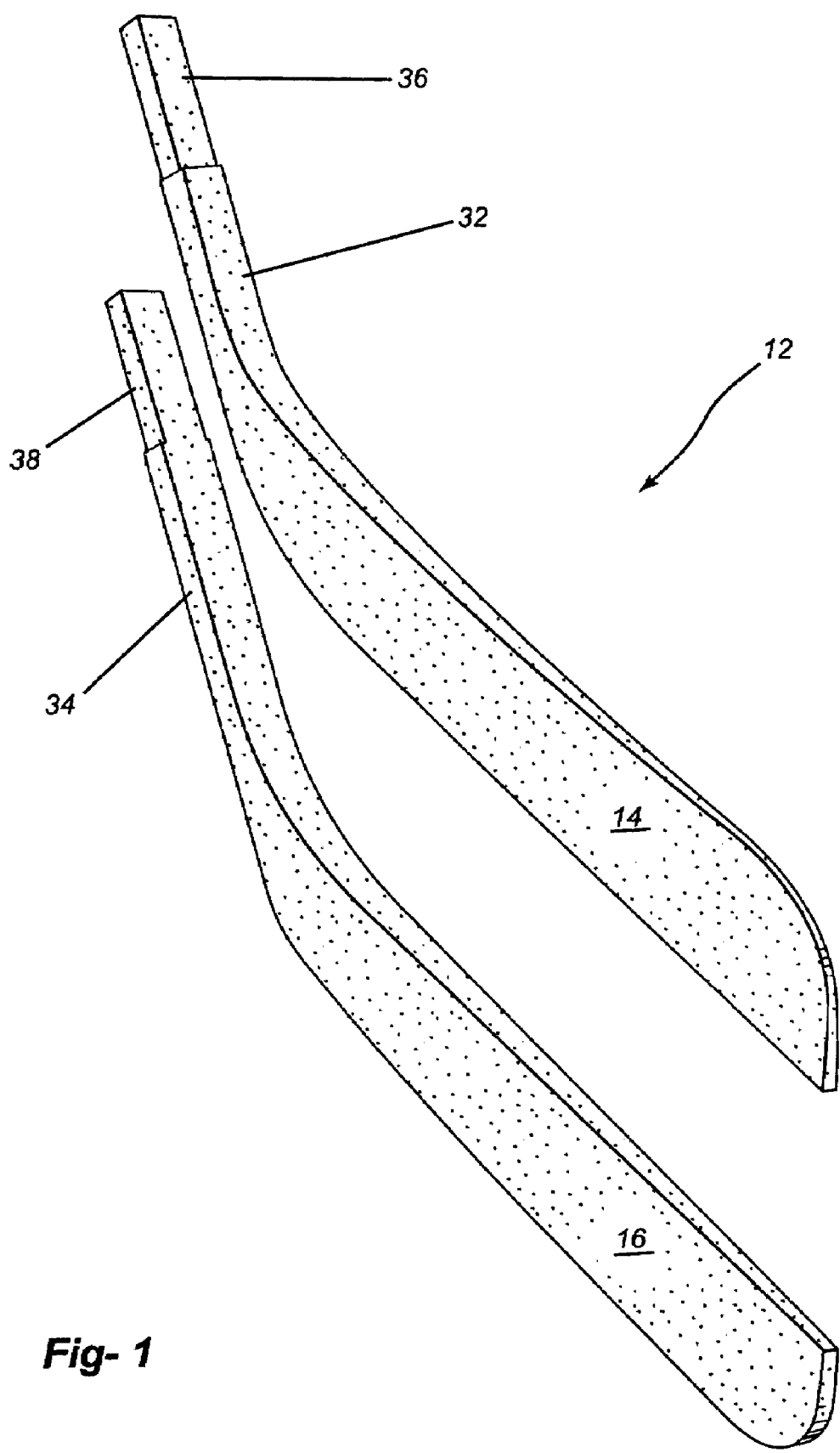
FIG. 1 is a perspective view of first and second core portions used in the construction of a formable hockey stick blade according to the invention.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION OF THE EMBODIMENTS

Figure 8:
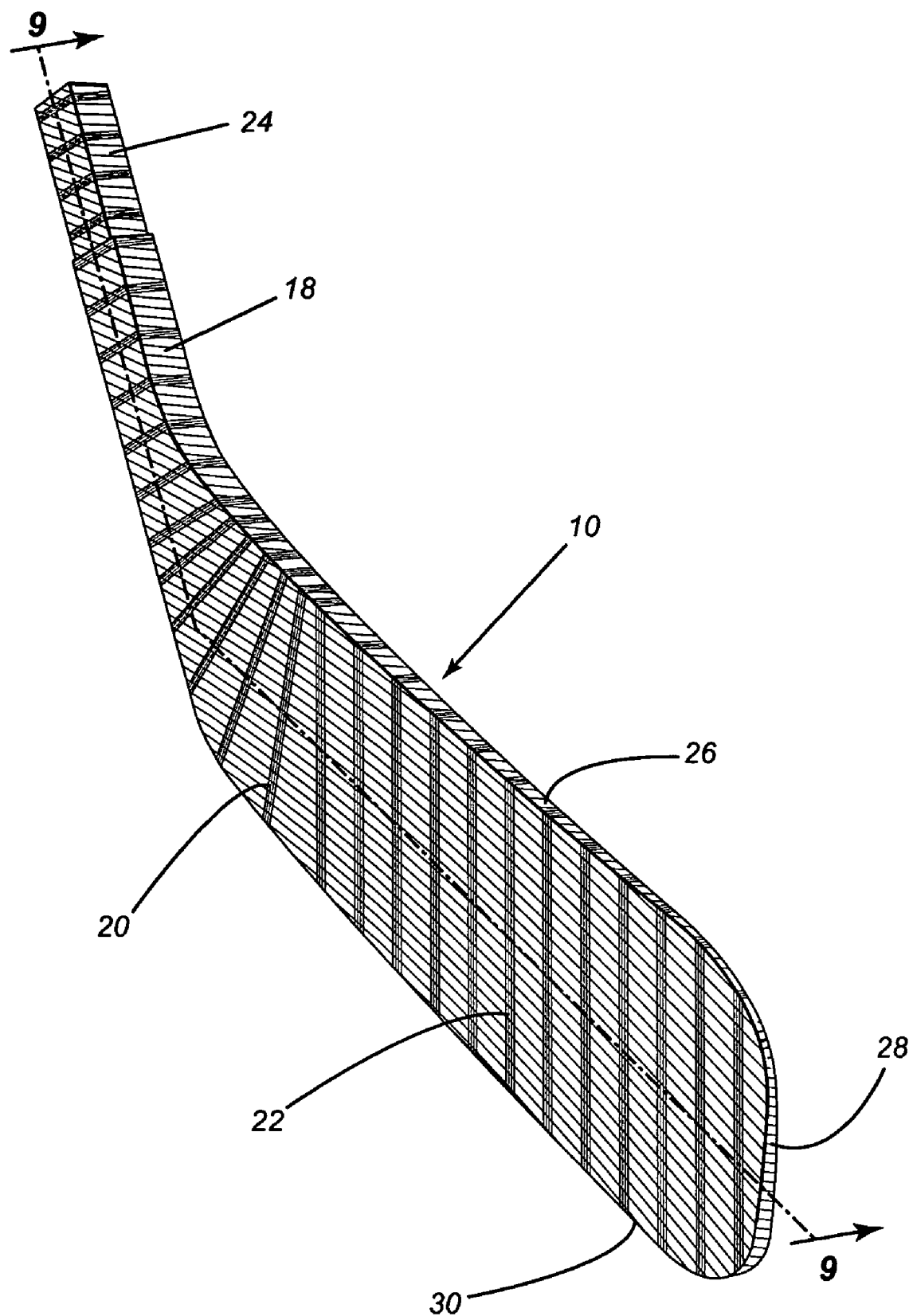
FIG. 8 is a perspective view of the formable hockey stick blade construed in accordance with the invention.

FIG. 8 illustrates a formable hockey stick blade 10 constructed in accordance with the invention. As used herein, the word "formable" means that the blade 10 can be heated and softened for shaping it to a selected curvature. The blade 10 is formable when heated to a temperature exceeding the glass transition point of the thermoplastic material used for making the blade 10. In fact, the temperature must be sufficiently high in order to bring the thermoplastic material to its amorphous form. The temperature increment can range between 25° F. and 50° F. above the glass transition point temperature. The glass transition point temperature of the thermoplastic-fibers matrix may be between 280° F. and 320° F. Moreover, since a thermoplastic material is used for making the blade 10, the blade 10 is also "reformable" i.e. it can be heated, softened and shaped a couple of times without suffering any substantial basic alteration in its properties.

The blade 10 comprises a shank 18, a heel section 20 and a blade element 22. The heel section 20 is located at the junction of the shank 18 and the blade element 22. The shank 18 comprises a tenon 24 adapted to be inserted into a hollow hockey stick shaft made of aluminum, composite or graphite. The blade element 22 comprises a top edge 26, a tip edge 28 and a bottom edge 30.

Figure 9:
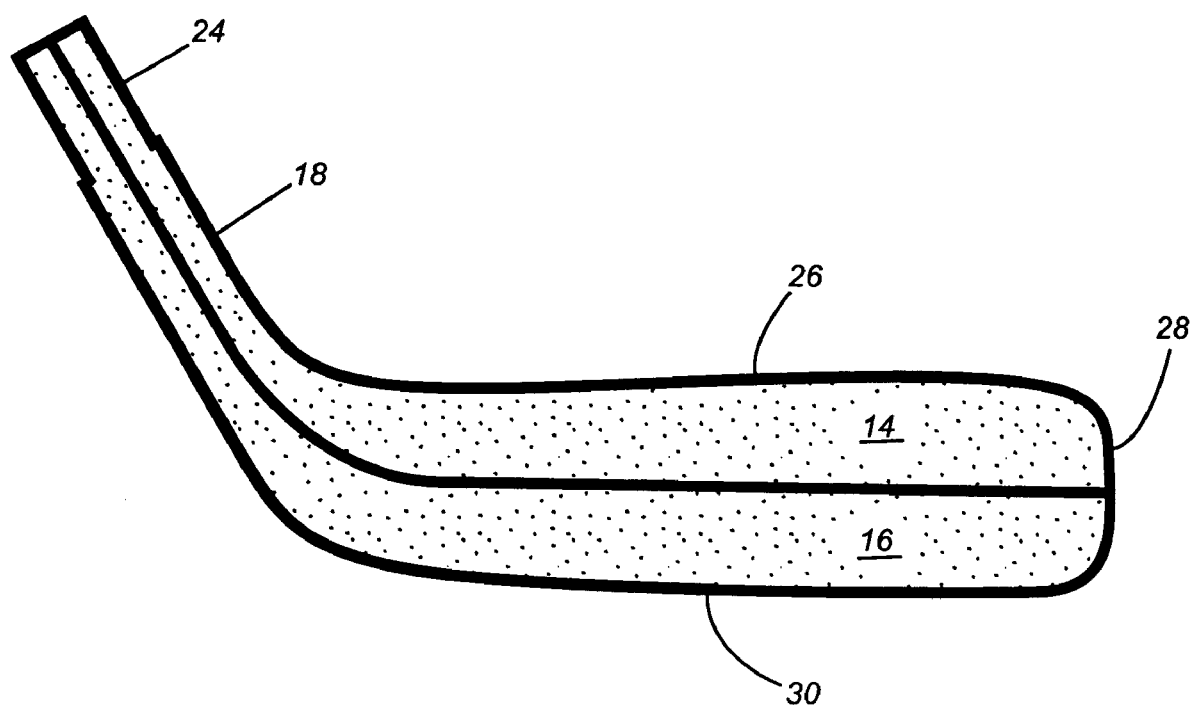
FIG. 9 is a cross-sectional view taken along lines 9-9.

Referring to FIGS. 1 and 9, the blade 10 comprises a foam core 12 extending along a longitudinal axis A-A. The foam core 12 has the general shape of a hockey stick blade. The foam core 12 comprises a first portion 14 located above and aligned with a second portion 16. The first and second portions 14, 16 are dimensioned such as to have the shape of a blade when aligned with one another. The first and second portions 14, 16 are made of expandable foam. For example, the first and second portions 14, 16 may be made of a closed-cell polymethacrymilide foam sold by Rohacell under the number 200WF, this foam having a Poisson ratio of 0.33. The Poisson ratio is the ratio of lateral strain to the longitudinal strain for a given material subjected to a uniform longitudinal stress with a proportional limit. Other suitable foam will be the RC 51 WF, RC 71 WF, RC 110 WF, RC 300 WF, foams sold by Rohacell and having respective Poisson ratios of 0.34, 0.37, 0.37 and 0.38. The first and second portions 14, 16 may be made of a closed-cell polyetherimid foam sold under the name AIREX R82. The first and second portions 14, 16 may also be made of a styrene acrylo nitrile thermoplastic foam produced by ATC Chemical Corporation under the name CORCE-CELL T and having a density of around 5.0 to 5.6 lbs/cubic.

The first and second portions 14, 16 form the blade element of the foam core 12 and may further comprise respective shank portions 32, 34 defining the core of the shank 18, these shank portions 32, 34 comprising respective tenon portions 36, 38. The shank portions 32, 34 generally extend upwardly and rearwardly from the heel section 20. Hence, the core 12 comprises the first portion 14 with its shank portion 32 and the second portion 16 with its shank portion 34.

It is understood that the core may comprise first and second portions that do not comprise respective first and second shank portions. In fact, the first and second portions of the core may be confined to the blade element of the hockey stick blade (from the heel section to the tip edge) and the shank may be a separate component that is joined to the blade element. For example, the shank may be made of wood and comprises a groove in which a tongue portion provided on the blade element is inserted for joining together both components.

Figure 2:
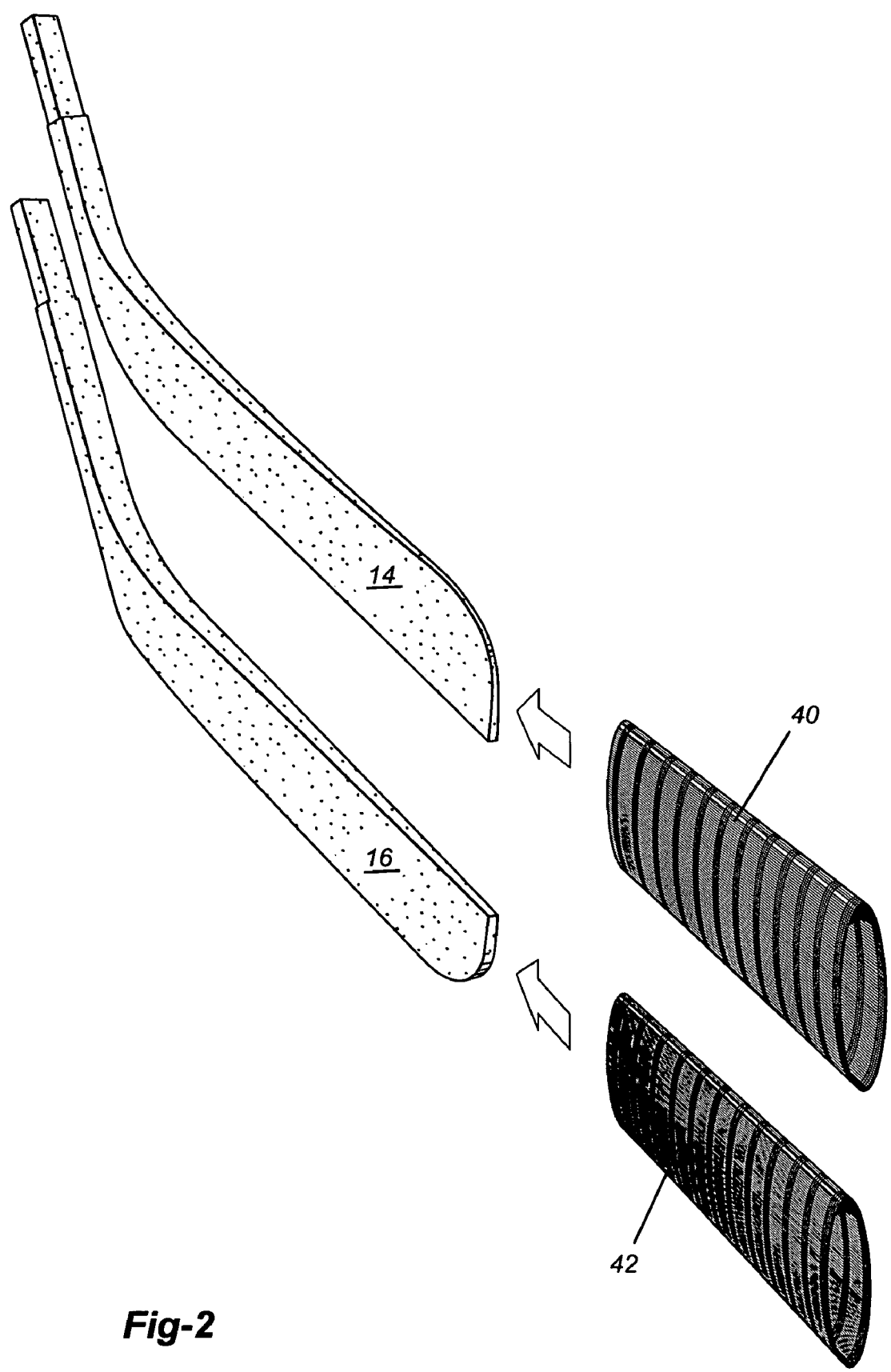
FIG. 2 is a perspective view of the first and second core portions of FIG. 1 with first and second fibers braids used in the construction of the blade.
Figure 3:
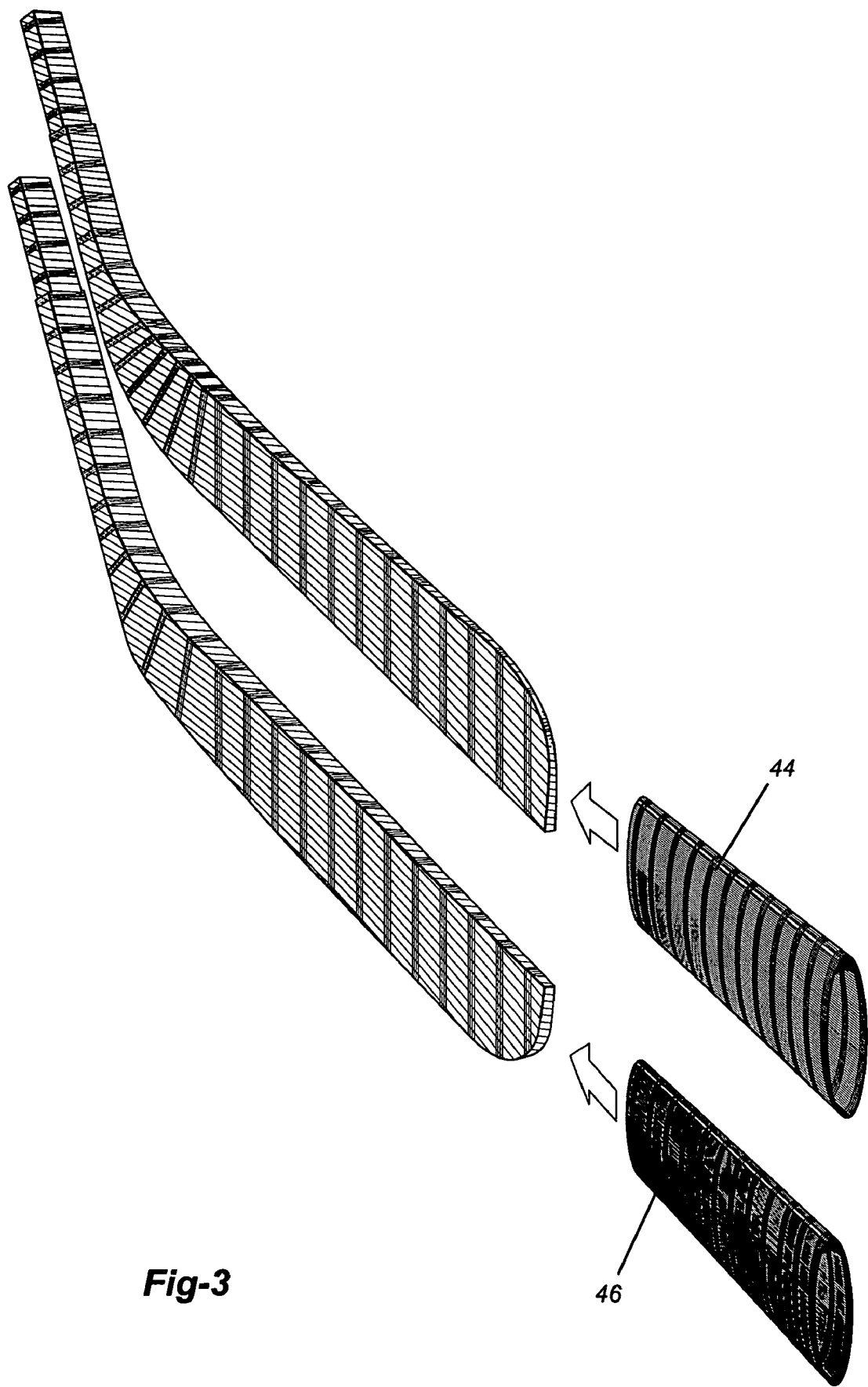
FIG. 3 is a perspective view of the first and second core portions and first and second fibers braids of FIG. 2 with further third and fourth fibers braid used in the construction of the blade of FIG. 1.
Figure 4:
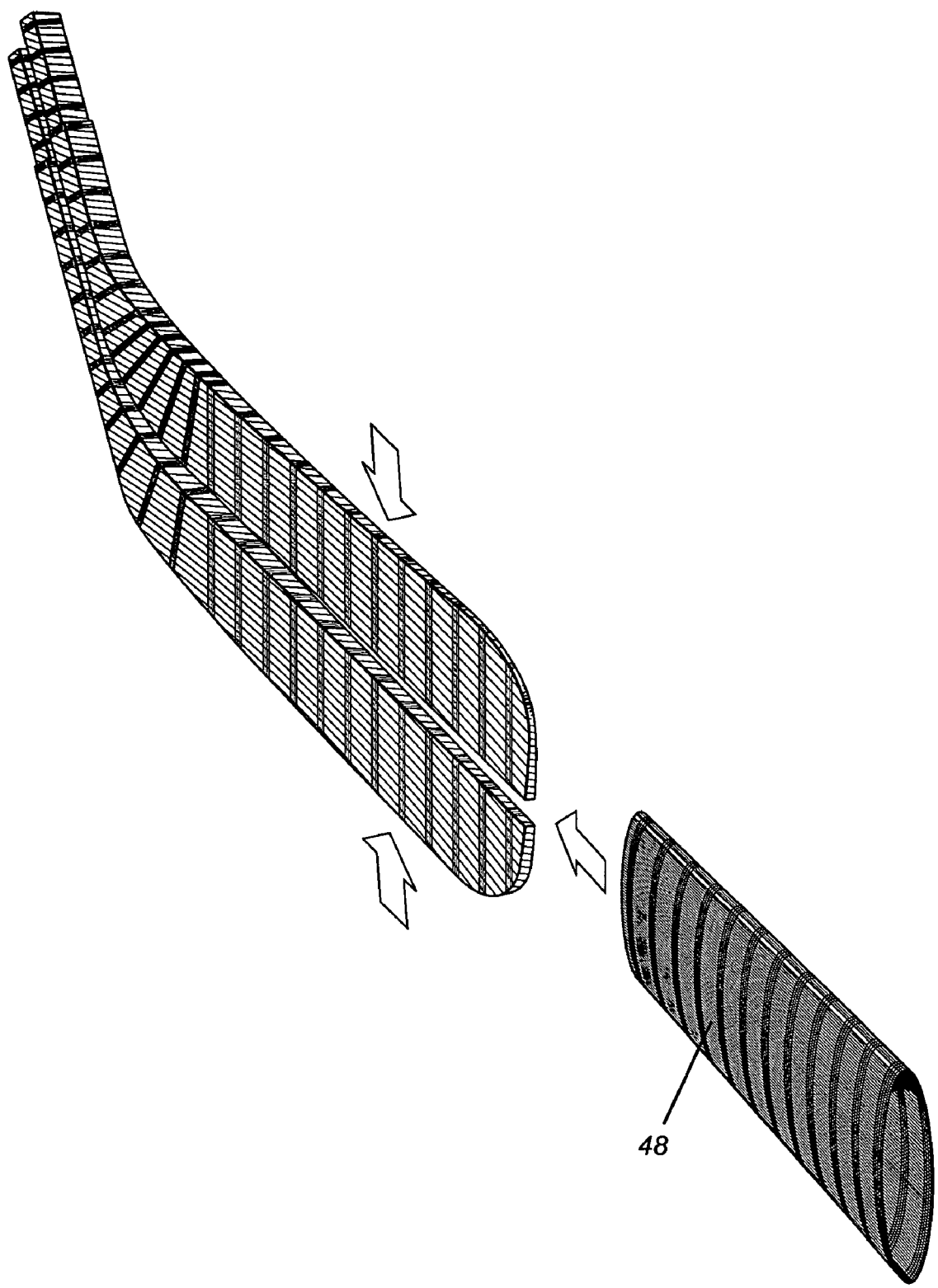
FIG. 4 is a perspective view of the first and second core portions and the fibers braids of FIG. 3 with a further fifth fibers braid used in the construction of the blade of FIG. 1.
Figure 5:
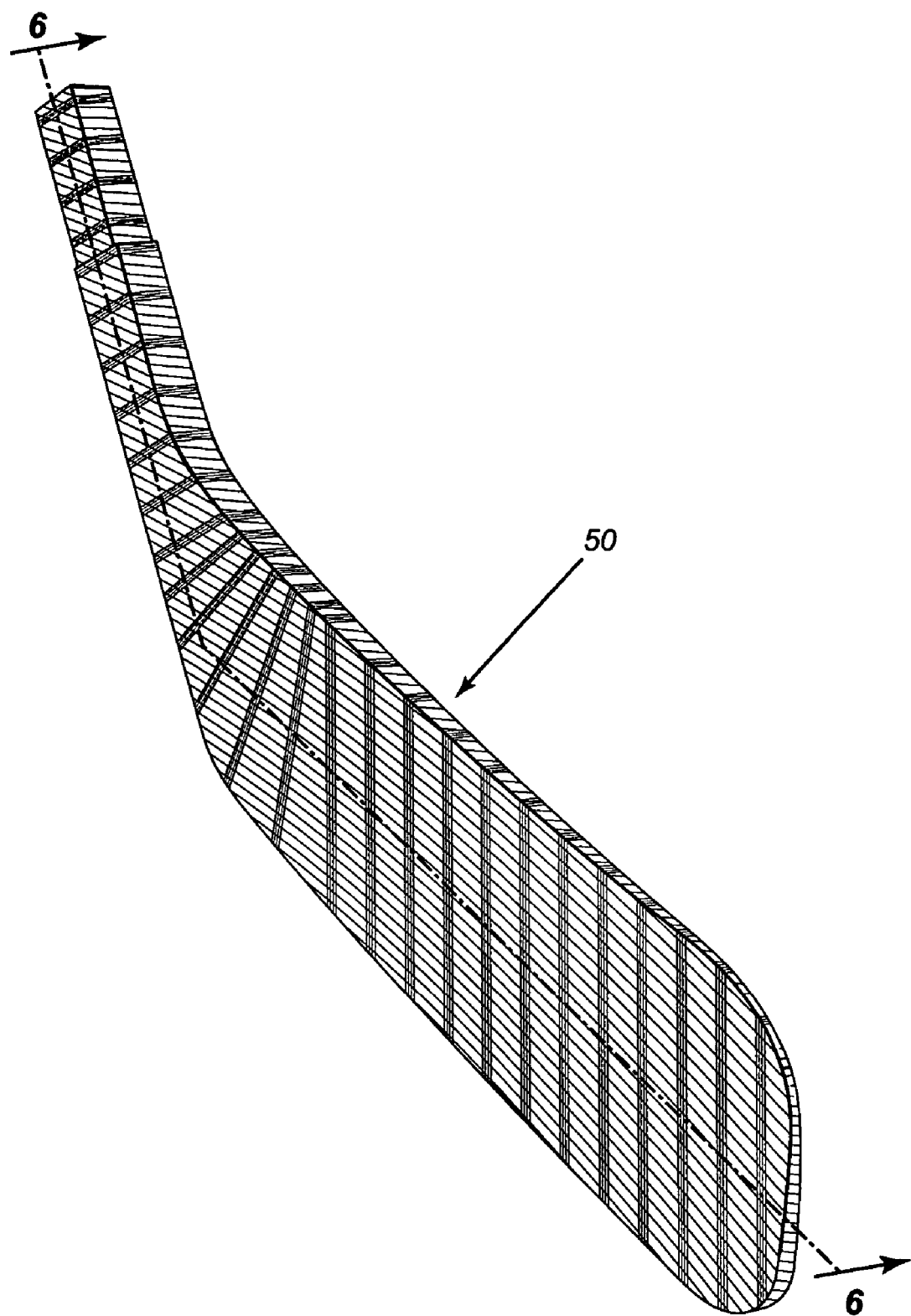
FIG. 5 is a perspective view of the preformed blade before the molding operation.

As shown in FIG. 2, a first fibers braid 40 is wrapped over the first portion 14 and a second fibers braid 42 is wrapped over the second portion 16. As shown in FIG. 3, third and fourth fibers braid 44, 46 are wrapped over the respective first and second fibers braids 40, 42 of the first and second portions 14, 16. As shown in FIG. 4, a fifth fibers braid 48 is wrapped over the third and fourth fibers 44, 46 of the first and second portions 14, 16 such as to realize a preformed blade 50 as shown in FIG. 5. Note that the preformed blade 50 comprises the foam core 12 and the fibers braids covering that foam core and is a "preformed" blade since it has to be placed in a mold in order to manufacture and form a formable blade such as the blade 10.

The fibers braids are expandable so as to conform to the shape of the first and second portions 14, 16 and are made of woven fibers selected from the group consisting of carbon fibers, glass fibers, KEVLAR fibers, ceramic fibers, boron fibers, quartz fibers, spectra fibers, polyester fibers and polyethylene fibers. The fibers are pre-impregnated with a thermoplastic material such as Nylon or polypropylene. Examples of suitable materials are the pre-impregnated fibers braid sold under the name HEXCEL TOWFLEX TF-CN6-100 (matrix of Nylon 6) and the pre-impregnated fibers braid sold under the name SCHAPPE TPFL-CARBON PA12 (matrix of Nylon 12). The fibers braids may be made of fibers crossing at 45°. However, any other fibers crossing at between 30° and 60° may be used. Unidirectional fiber braids may also be used. Note that the foam core 12 and the fibers braids should have similar processing temperatures. In other words, the softening point of the thermoplastic-fibers matrix should be similar to the softening point of the foam.

Figure 7:
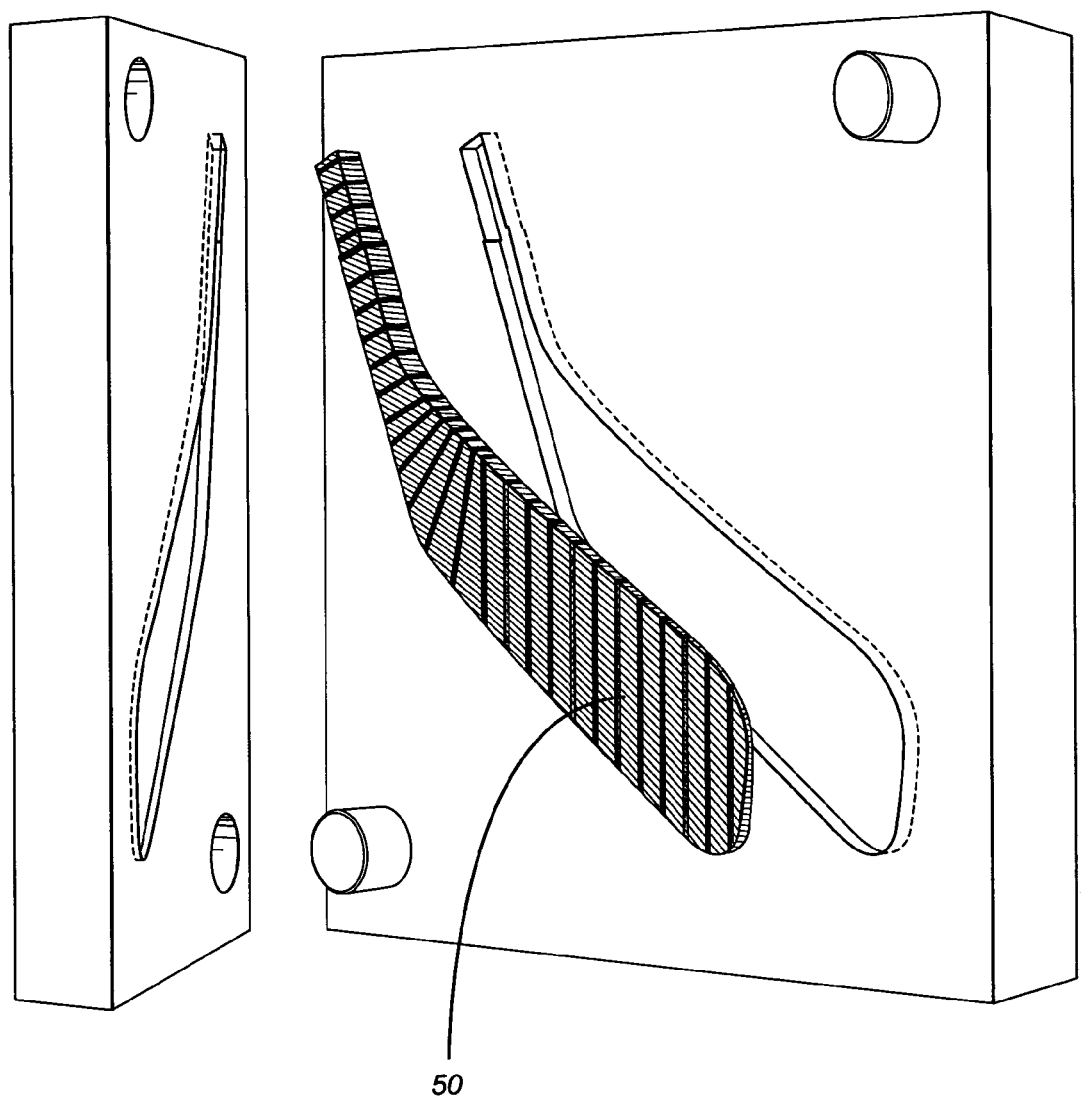
FIG. 7 is a perspective view of the preformed blade of FIG. 6 and a mold.

As shown in FIG. 7, the preformed blade 50 is afterwards inserted in a mold in order to manufacture the formable blade 10. At that point, the mold may be at a temperature of about 420° F. It is understood that the mold may be heated before or after the the introduction of the preformed blade 50 in the mold or it may remain at a steady temperature during the entire process. Heat is therefore applied to the mold in order to melt the thermoplastic-fibers matrix and soften the foam core 12 of the preformed blade 50. Pressure is also maintained on the mold in order to compress the blade during the process. It is understood that the pressure exerted on the mold must be sufficient to keep the male-female mold parts together, to crush the form core 12 and to sustain the internal pressure created by the foam when heated.

As previously indicated, the foam core 12 has the general shape of a hockey stick blade. However, the foam core has an initial thickness greater then its final thickness. For instance, the initial thickness of the foam core may be 1.5 to 10 times greater than the final thickness of the blade element 22 of the formable blade 10. Indeed, due to the Poisson ratio of at least 0.33, the foam core 12 may flow and conform to the internal cavity of the mold while applying pressure to the outer layers of pre-impregnated fibers in order to consolidate together the thermoplastic material and the fibers, which then form the thermoplastic-fibers matrix. The internal pressure created by the heated foam should also be sufficient to bond together the foam core and the thermoplastic-fibers matrix. The thickness of the foam core 12 may be then considerably reduced. In fact, the foam core, more particularly the blade element of the foam core, is crushed during the process and its density may increase from 5 to 6 lbs/cubic foot to 6.5 to 20 lbs/cubic foot and its thickness may be reduced from 6 to 30 mm to 1 to 3 mm. For example, if the foam has an initial density of 5 lbs/cubic foot, this foam will have a density of around 15 lbs/cubic foot at the end if the initial thickness of the blade element of the foam core is three (3) times greater than its final thickness. The density of the crushed foam is therefore the density of the initial foam multiply with the initial thickness of the foam core divided with the thickness of the final foam core.

The mold remains at a temperate of at least 420° F. for at least 2 minutes in order to bring the thermoplastic material to its amorphous form. It is understood that a minimum temperature of about 375° F. may be used but the processing time would then be longer. When the fibers-thermoplastic matrix is set after cooling, the mold is opened and the formable blade 10 is removed from the mold. Note that the blade 10 has the general shape of a straight hockey stick blade. Excess material may be trimmed off.

Figure 6:
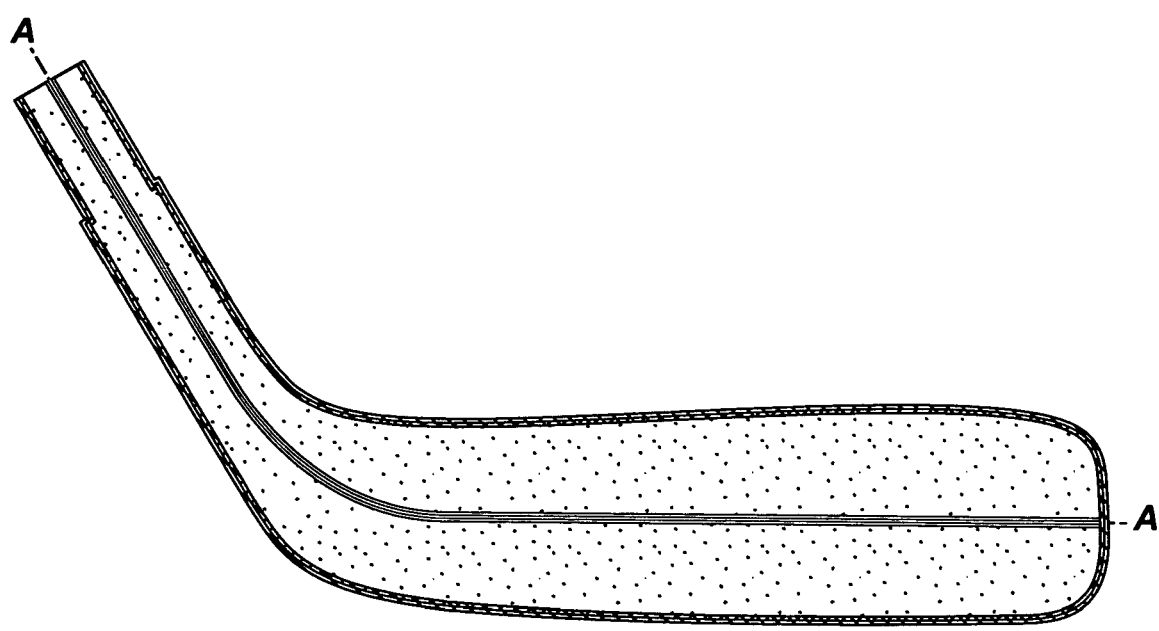
FIG. 6 is a cross-sectional view taken along lines 6-6.

FIG. 6 shows a cross section view of the preformed blade 50 for illustrating the fiber braids before the molding process. In fact, once the thermoplastic-fibers matrix is set (see large lines on FIG. 9), the formable blade 10 comprises an interface between the first and second portions 14, 16, this interface comprising fibers oriented transversely relative to the longitudinal axis A-A. The thermoplastic-fibers matrix of the edges 26, 28, 30 (see large lines on FIG. 9) may also comprise fibers oriented transversely relative to the longitudinal axis A-A.

The blade 10 is a formable straight blade and it is therefore possible to supply this blade to stores that will then tailor the blade 10 by heating and applying pressure to shape it according to a curvature selected by a customer.

The above description of the embodiments should not be interpreted in a limiting manner since other variations, modifications and refinements are possible within the spirit and scope of the present invention. The scope of the invention is defined in the appended claims and their equivalents.

The invention claimed is:

1. A method of making a formable hockey stick blade, the method comprising:
   (a) providing a core having a blade element with a thickness, the core being made of expandable foam having a Poisson ratio of at least 0.33;
   (b) forming a preformed stick blade by wrapping the core with a layer of fibers pre-impregnated with a thermoplastic material;
   (c) placing the preformed stick blade in a mold;
   (d) applying heat and pressure to the mold for bringing the thermoplastic material to its amorphous form and for compressing the preformed stick blade such that the thickness of the blade element of the core is reduced;

(e) cooling the mold such that the thermoplastic material is set; and (f) removing the formable stick blade from the mold.

2. A method as defined in claim 1, wherein the thickness of the blade element of the core is reduced by at least 10%.

3. A method as defined in claim 2, wherein the thickness of the blade element of the core is reduced by at least 20%.

4. A method as defined in claim 3, wherein the thickness of the blade element of the core is reduced by at least 30%.

5. A method as defined in claim 4, wherein the thickness of the blade element of the core is reduced by at least 75%.

6. A method as defined in claim 1, wherein the initial thickness of the blade element of the core is between 6 mm and 20 mm and the final thickness of the blade element of the core is between 1 mm and 3 mm.

7. A method as defined in claim 6, wherein the temperature of the mold is maintained between 375° F. and 425° F. during step (d).

8. A method as defined in claim 6, wherein the temperature of the mold is maintained between 375° F. and 425° F. during at least 2 minutes during step (c).

9. A method as defined in claim 6, wherein the temperature of the mold is maintained between 375° F. and 425° F. during steps (c) and (d).

10. A method as defined in claim 6, wherein the thermoplastic material is made of Nylon or polypropylene.

11. A method as defined in claim 1, wherein the pressure exerted on the mold is sufficient to sustain the internal pressure created by the heated foam.

12. A method as defined in claim 11, wherein the internal pressure created by the heated foam is sufficient to consolidate together the fibers and the thermoplastic material.

13. A method as defined in claim 12, wherein the internal pressure created by the heated foam is sufficient to bond together the core and the consolidated fibers and thermoplastic material.

14. A method as defined in claim 13, wherein step (a) comprises cutting first and second portions such that the first portion comprises a bottom surface following a longitudinal axis of the blade and the second portion comprises a top surface following the longitudinal axis, the first and second portion forming the blade element of the core once the first portion is aligned with and placed over the second portion.

15. A method as defined in claim 14, wherein step (b) comprises wrapping the first portion in a first fiber braid and the second portion in a second fiber braid, the first and second fibers braid comprising fibers selected from the group consisting of carbon fibers, glass fibers, KEVLAR fibers, ceramic fibers, boron fibers, quartz fibers, spectra fibers, polyester fibers and polyethylene fibers.

16. A method as defined in claim 15, wherein step (b) further comprises wrapping the first and second portions and first and second fiber braids in respective third and fourth fiber braids that comprise fibers selected from the group consisting of carbon fibers, glass fibers, KEVLAR fibers, ceramic fibers, boron fibers, quartz fibers, spectra fibers, polyester fibers and polyethylene fibers.

17. A method as defined in claim 16, wherein step (b) further comprises wrapping the first and second portions and first, second, third and fourth fiber braids in a fifth fiber braid that comprises fibers selected from the group consisting of carbon fibers, glass fibers, KEVLAR fibers, ceramic fibers, boron fibers, quartz fibers, spectra fibers, polyester fibers and polyethylene fibers.

18. A method as defined in claim 17 further comprising trimming said formable hockey stick blade.

19. A method as defined in claim 1, wherein the initial density of the blade element of the core is between 5 lbs cubic/foot and 6 lbs/cubic foot and the final density of the blade element of the core is between 6.5 lbs/cubic foot and 20 lbs/cubic foot.

\* \* \* \* \*